United States Patent
Moriguchi et al.

(10) Patent No.: US 11,602,812 B2
(45) Date of Patent: Mar. 14, 2023

(54) VERTICAL MACHINE TOOL AND TOOL CHANGING METHOD

(71) Applicant: SUGINO MACHINE LIMITED, Uozu (JP)

(72) Inventors: Takuya Moriguchi, Uozu (JP); Yasuhiro Tominaga, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 6 days.

(21) Appl. No.: 17/471,611

(22) Filed: Sep. 10, 2021

(65) Prior Publication Data
US 2022/0080543 A1 Mar. 17, 2022

(30) Foreign Application Priority Data
Sep. 14, 2020 (JP) .............................. JP2020-153801

(51) Int. Cl.
*B23Q 3/157* (2006.01)
*B23Q 3/155* (2006.01)

(52) U.S. Cl.
CPC ....... *B23Q 3/15773* (2013.01); *B23Q 3/1554* (2013.01); *B23Q 3/15766* (2013.01);
(Continued)

(58) Field of Classification Search
CPC ......... Y10T 483/1748; Y10T 483/1752; Y10T 483/1755; Y10T 483/1767; Y10T 483/1779; Y10T 483/1783; Y10T 483/1786; Y10T 483/1818; Y10T 483/1827; Y10T 483/1864;
(Continued)

(56) References Cited

U.S. PATENT DOCUMENTS 4,419,807 A * 12/1983 Moulin .............. B23Q 3/15526
408/35
4,701,994 A * 10/1987 Noh ...................... B23B 31/006
483/65

(Continued)

FOREIGN PATENT DOCUMENTS

EP 257643 A * 3/1988
JP 58223543 A * 6/1982

(Continued)

OTHER PUBLICATIONS

Office Action dated Jun. 29, 2021 in a corresponding Japanese Patent Application No. 2020-153801.

*Primary Examiner* — Boyer D Ashley
*Assistant Examiner* — Michael Vitale
(74) *Attorney, Agent, or Firm* — United IP Counselors, LLC

(57) ABSTRACT

Provided is a compact tool changer. The vertical machine tool includes a frame, a spindle, a moving device for moving the spindle, a magazine including a plurality of pots that move up and down installed in a pot holder, a pot lifter for moving up and down the pot at a pot tool changing position, and an intermediate arm assembly that moves among a magazine position, an intermediate position, and a spindle position. The intermediate arm assembly includes an arm
(Continued)

having a first gripper and a second gripper, and an arm rotation device for positioning the first gripper or the second gripper to either a pot phase or a spindle phase.

20 Claims, 11 Drawing Sheets

(52) U.S. Cl.
 CPC .............. *B23Q 2003/15532* (2016.11); *B23Q 2003/155418* (2016.11); *Y10T 483/1767* (2015.01); *Y10T 483/1786* (2015.01); *Y10T 483/1864* (2015.01)

(58) Field of Classification Search
 CPC ............ B23Q 3/15722; B23Q 3/15753; B23Q 3/15766; B23Q 3/15773; B23Q 2003/15532; B23Q 2003/155418
 USPC ... 483/36, 38, 39, 44, 49, 51, 52, 60, 61, 65
 See application file for complete search history.

(56) References Cited

U.S. PATENT DOCUMENTS

| | | | | | |
|---|---|---|---|---|---|
| 5,688,215 | A | * | 11/1997 | Mase | B23Q 3/15733 483/66 |
| 5,704,885 | A | * | 1/1998 | Lee | B23Q 3/15526 483/65 |
| 5,871,426 | A | * | 2/1999 | Araki | B23Q 3/15526 483/49 |
| 2004/0029391 | A1 | * | 2/2004 | Kirkpatrick | H01L 21/3105 438/735 |

FOREIGN PATENT DOCUMENTS

| | | | |
|---|---|---|---|
| JP | H04-087748 A | | 3/1992 |
| JP | H06-057536 U | | 8/1994 |
| JP | 2761813 B2 | | 6/1998 |
| JP | H11-254261 A | | 9/1999 |
| JP | 2001-071228 A | | 3/2001 |
| JP | 2004090173 A | * | 3/2004 |
| JP | 2006-326709 A | | 12/2006 |
| JP | 4028782 B2 | | 12/2007 |

\* cited by examiner

VERTICAL MACHINE TOOL AND TOOL CHANGING METHOD

CROSS-REFERENCE TO RELATED APPLICATIONS

This application claims the benefit of priority to Japanese Patent Application No. 2020-153801, filed on Sep. 14, 2020, the entire contents of which are hereby incorporated by reference.

BACKGROUND

1. Technical Field

The present invention relates to a vertical machine tool and a tool changing method.

2. Description of the Background

A tool pot is used for holding a tool in a tool changer of a machine tool (Japanese Patent No. 4028782). Also, a gripper is used to grip the tool (Japanese Patent No. 2761813).

BRIEF SUMMARY

An object of the present invention is to provide a vertical machine tool and a tool changing method capable of downsizing a tool changer.

A first aspect of the present invention provides a vertical machine tool, including:
- a frame;
- a spindle having a spindle hole configured to mount a tool;
- a moving device installed on the frame, the moving device configured to relatively move the spindle with respect to the frame;
- a magazine including
  - a pot holder having a plurality of pot holding holes, and
  - a plurality of pots each penetrating the pot holding hole to house the tool, the plurality of pots configured to move up and down between an elevated position and a changing position;
- a pot lifter installed on the frame, the pot lifter configured to move up and down the pot located at a pot tool changing position;
- a linear motion guide installed on the frame;
- an intermediate arm assembly installed on the linear motion guide, the intermediate arm assembly including
  - an arm including a first gripper and a second gripper, and
  - an arm rotation device configured to position the first gripper or the second gripper to either a pot phase or a spindle phase; and
- an intermediate arm feeder configured to move the intermediate arm assembly among a magazine position nearer to the magazine, a spindle position nearer to the spindle, and an intermediate position located between the magazine position and the spindle position.

A second aspect of the present invention provides a tool changing method, including:
- stopping a rotation of a spindle;
- moving the spindle to a spindle tool change position;
- rotating a first gripper to a spindle phase by an arm;
- moving the arm from an intermediate position between a magazine and the spindle to the spindle tool change position for the first gripper to grip a first tool mounted on the spindle;
- unclamping the first tool by the spindle to move up the first tool away from the spindle;
- rotating the second gripper gripping a second tool to the spindle phase by the arm;
- moving down the spindle to clamp the second tool;
- moving the arm to a magazine position for the second gripper to release the second tool;
- rotating the first gripper to a magazine phase;
- moving the arm to the magazine position for the first tool to be located under an empty first pot;
- moving down a pot lifter to house the first tool into the first pot;
- retracting the arm to a retracted position for the first gripper to release the first tool;
- rotating a second pot mounting a third tool to a pot tool changing position by a pot holder;
- rotating the second gripper to the magazine phase by the arm;
- moving the arm to the magazine position for the second gripper to grip the third tool;
- moving up the second pot by the pot lifter to pass the third tool to the second gripper; and
- moving the arm to the intermediate position.

The vertical machine tool is a machine tool that performs cutting work. A cutting tool mounted on a spindle head performs the cutting work.

The spindle has a spindle hole and a tool clamping device.

The pot holder is, for example, a magazine disc or a magazine chain.

The pot includes a tool holding portion, a tool holding hole, and a tool clamping device.

A linear motion guide connected to the pot lifter is, for example, a linear guide, a ball spline, or a combination of a guide bush and a guide sliding with the guide bush.

The linear motion guide for guiding up and down the pot is, for example, a linear guide, a ball spline, or a combination of a guide bush and a guide sliding with the guide bush.

The linear motion guide may also include a guide frame fixed to the frame, and a guide for vertically moving up and down on the guide frame. For example, the guide frame has a guide groove extending in the vertical direction, and the guide may be a pin that is connected to the pot to move along the guide groove through the guide groove.

The tools may be housed in specific pots assigned to each. In this case, the tool number of the tool may be the pot number for storing. Also, the tool may be stored in either of the empty pots, rather than in a specific pot. At this time, the tool number of the stored tool is stored in association with the pot number.

The arm is, for example, L-shaped or straight. The distal end of the arm includes a gripper which grips the tool. Multiple (e.g., two to four) arms may be provided. Three arms may be T-shaped. Four arms may be cross-shaped.

The arm rotation device is a servo motor, a stepping motor, or a combination of a motor and a cam device.

The intermediate arm feeder is, for example, a rack and pinion mechanism or a servo motor ball screw mechanism.

Preferably, the vertical machine tool includes a numerical control device. The moving device is numerically controlled. The moving device is a moving device having 3 to 5 axes. The moving device has a translation axis, for example, in a lateral direction (X-axis), in a longitudinal direction (Y-axis), and in a vertical direction (Z-axis) as viewed from the front. The moving device may have a rotation axis rotating about the lateral direction (A-axis), a rotation axis rotating about the vertical direction (C-axis), and a rotation axis rotating about the longitudinal direction (B-axis). The above-described translation axis and rotation axis may be located on either the spindle head or the table.

A shutter may be provided between the spindle and the intermediate arm assembly so that chips generated by cutting work do not enter the magazine side.

The vertical machine tool and the tool changing method according to the present invention enable to downsize the tool changer.

DETAILED DESCRIPTION

First Embodiment

Figure 1:
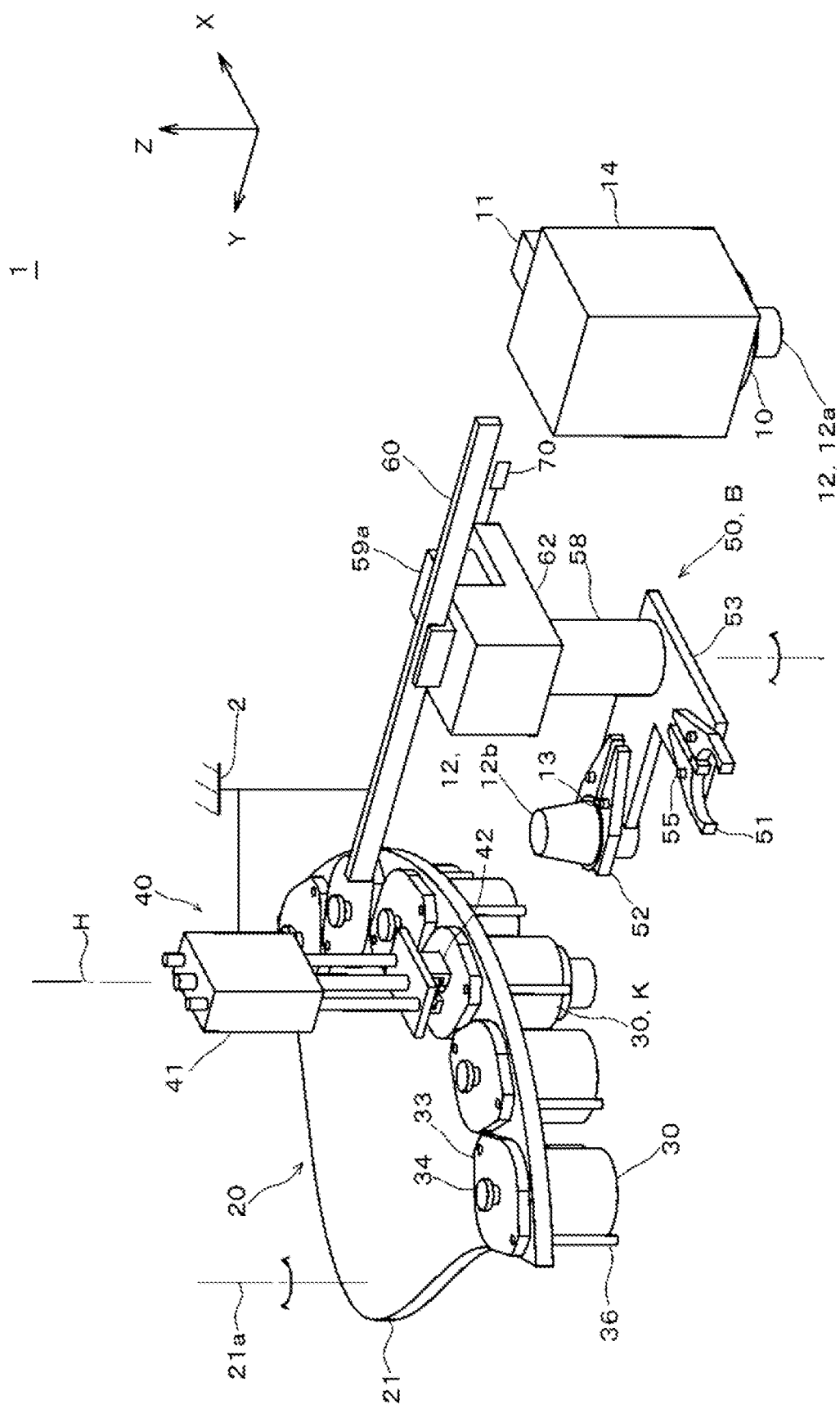
FIG. 1 is a perspective view of a vertical machine tool of a first embodiment.

As shown in FIG. 1, the machine tool includes a frame 2, a spindle head 14, a spindle 10, a moving device 11, a magazine 20, a pot 30, a pot lifter 40, an intermediate arm assembly 50, a linear motion guide 60, and an intermediate arm feeder 70.

Figure 7:
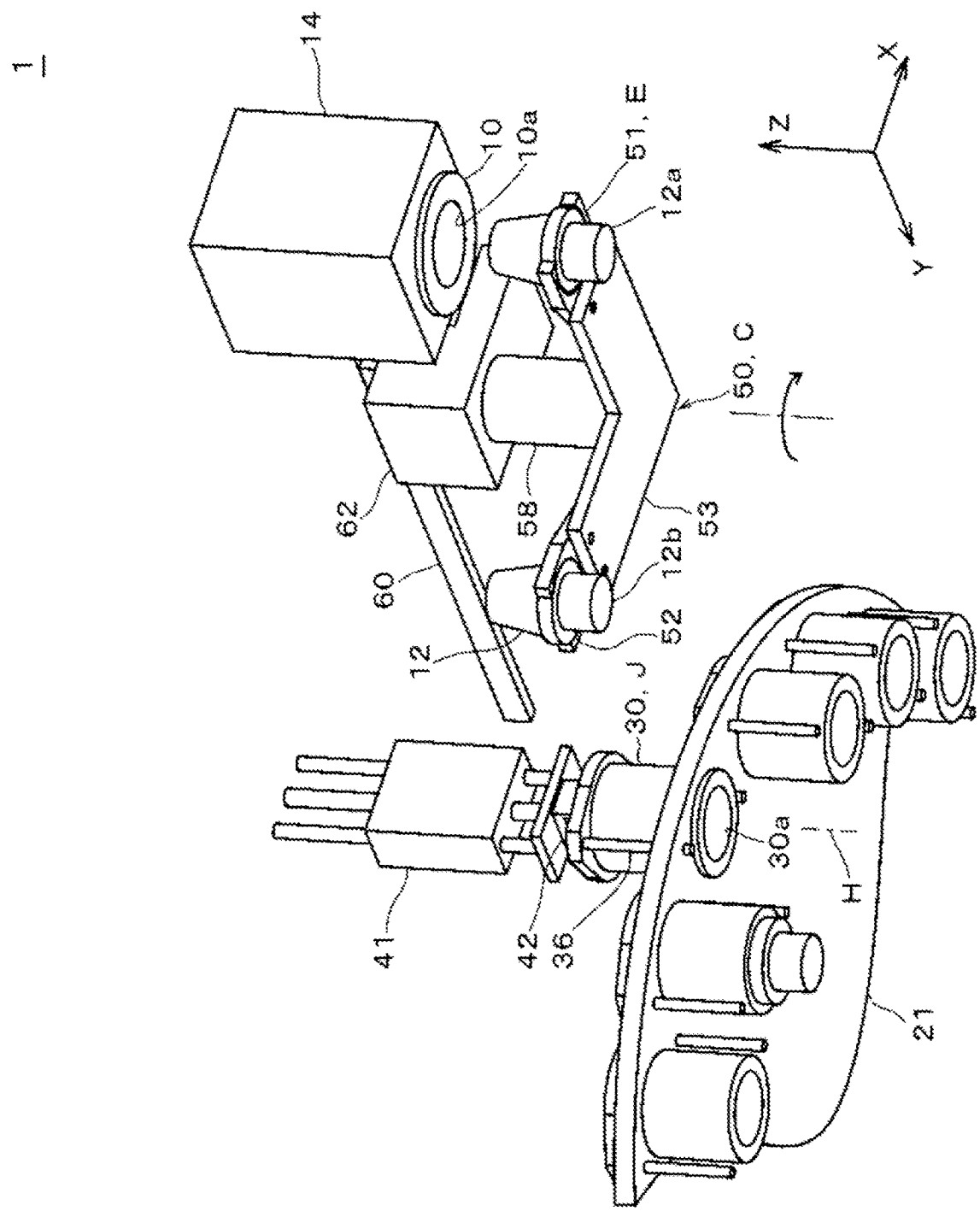
FIG. 7 is a perspective view showing the tool changing status.

As shown in FIGS. 1 and 7, the moving device 11 is installed on the frame 2. The spindle head 14 is installed on the moving device 11. The spindle 10, which has a spindle hole 10a, is rotatably supported by the spindle head 14. The spindle 10 extends vertically downward. The spindle 10 moves freely with respect to the frame 2 by the moving device 11.

Figure 2:
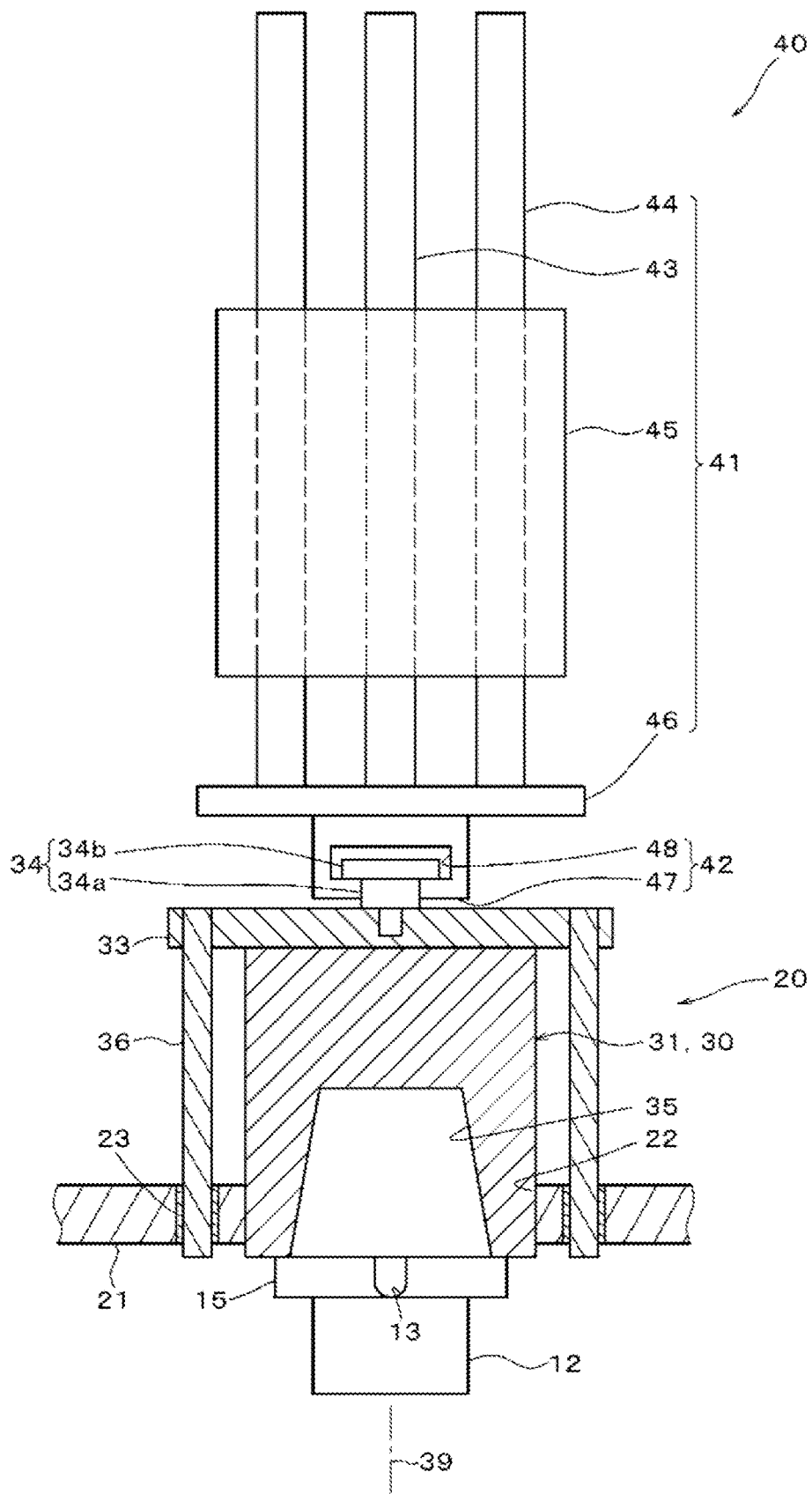
FIG. 2 is a longitudinal sectional view of a pot lifter of the first embodiment.

As shown in FIGS. 1 and 2, the magazine 20 includes a magazine disc (pot holder) 21, a pot 30, a top plate 33, a guide bush 23, and a guide 36. The magazine disc 21 has a pot holding hole 22. The magazine disc 21, which has a disc shape, is arranged horizontally. The pot holding holes 22, each of which is a through hole, are arranged at a constant angle on the outer periphery of the magazine disc 21. The magazine disc 21 is rotatably supported about a pivot axis 21a. The magazine disc 21 is driven by, for example, a servo motor, or a cam (both not shown). The magazine disc 21 rotates to position any pot 30 at a pot tool changing position H.

FIG. 2 is a cross-sectional view taken along ZX plane showing the pot 30 and the pot lifter 40 at an elevated position J. The cross-sectional plane is rotated for showing a center axis of the guide 36 at the center.

The guide bushes 23 are arranged on both sides of the pot 30 through the magazine disc 21.

A plurality of pots 30 are disposed vertically through the pot holding holes 22. The pot 30 is installed so as to move up and down. The pot 30 has a tool holding hole 35 for holding the tool, and a cylindrical surface 31 that is an outer peripheral surface. The cylindrical surface 31 may slide with the pot holding hole 22.

The top plate 33 is installed above the pot 30. The top plate 33 has, for example, a rhombic shape. The top plate 33 is larger than the outer diameter of the cylindrical surface 31.

The guides 36 extend below the top plate 33 to be installed on both sides of the pot 30. The guide 36 penetrates the guide bush 23 to vertically slide in the guide bush 23. The guide 36 and the guide bush 23 guide the pot 30 when the pot 30 moves up and down.

A knob 34 has a cylindrical shaft portion 34a, and a disc portion 34b. The cylindrical shaft portion 34a, which is coaxial with the pot 30, is fixed to the top plate 33. The disc portion 34b is disposed coaxially with the pot 30 above the cylindrical shaft portion 34a.

The pot 30, the top plate 33, the knob 34, and the guide 36 integrally move up and down between the elevated position J (see FIG. 6) and a changing position K (see FIG. 1).

Here, the changing position K is a position at which the top plate 33 is lowered until the top plate 33 is placed on the magazine disc 21. At the changing position K, the pot 30 transfers the tool 12 to a first gripper 51 or a second gripper 52, both of which will be described later. The magazine disc 21 rotates when the pot 30 is at the changing position K.

The elevated position J is a position at which the tool 12 gripped with the first gripper 51 or the second gripper 52 is completely separated from the pot 30. When the pot 30 is at the elevated position J, the first gripper 51 or the second gripper 52 gripping the tool 12 can move back and forth below the pot 30 without interfering the tool 12 with and the pot 30. The first gripper 51 or the second gripper 52 may rotate when the plurality of pots 30 held by the magazine disc 21 are spaced apart from each other.

At a pot tool changing position H, the center axis 39 of the pot 30 is located at a phase for changing the tool.

The pot lifter 40 is disposed on the center axis 39 of the pot 30 at the pot tool changing position H. The pot lifter 40 includes a cylinder 41, and a hook member 42. The pot lifter 40 is fixed to the frame 2.

The cylinder 41 is a guided cylinder. For example, the cylinder 41 includes a body 45, a piston rod 43, a plate 46, and a guide shaft 44. The plate 46 and the guide shaft 44 move up and down integrally with the piston rod 43. The cylinder 41 has a center axis that is coaxial with the center axis 39. A double acting cylinder and a linear motion guide may be provided instead of the guided cylinder.

The hook member 42 is disposed on the plate 46. The hook member 42 includes a catch claw 47 and a passage hole 48. The passage hole 48, which extends circumferentially of the magazine disc 21, penetrates the hook member 42. The passage hole 48 has a T-shaped cross section. When the pot lifter 40 is lowered to the changing position K, the knob 34 provided on the top plate 33 passes through the passage hole 48 as the magazine disc 21 rotates. The catch claw 47 extends from the right and left toward the center of the passage hole 48 below the passage hole 48. The catch claw 47 passes under the knob 34. When the cylinder 41 moves up and down, the catch claw 47 is caught in the knob 34 to move up and down the pot 30.

Figure 4:
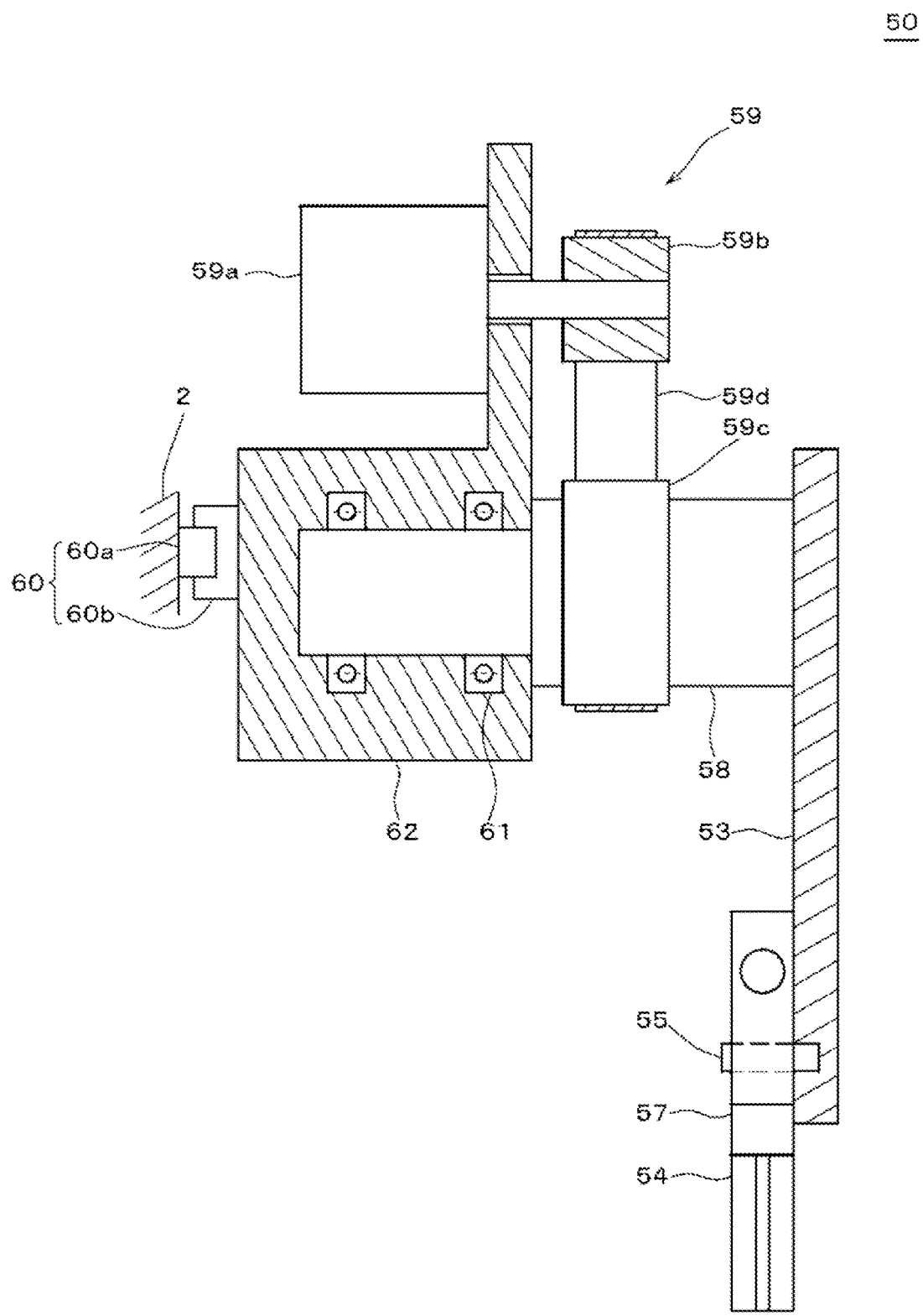
FIG. 4 is a cross-sectional view of the intermediate arm assembly.
Figure 5:
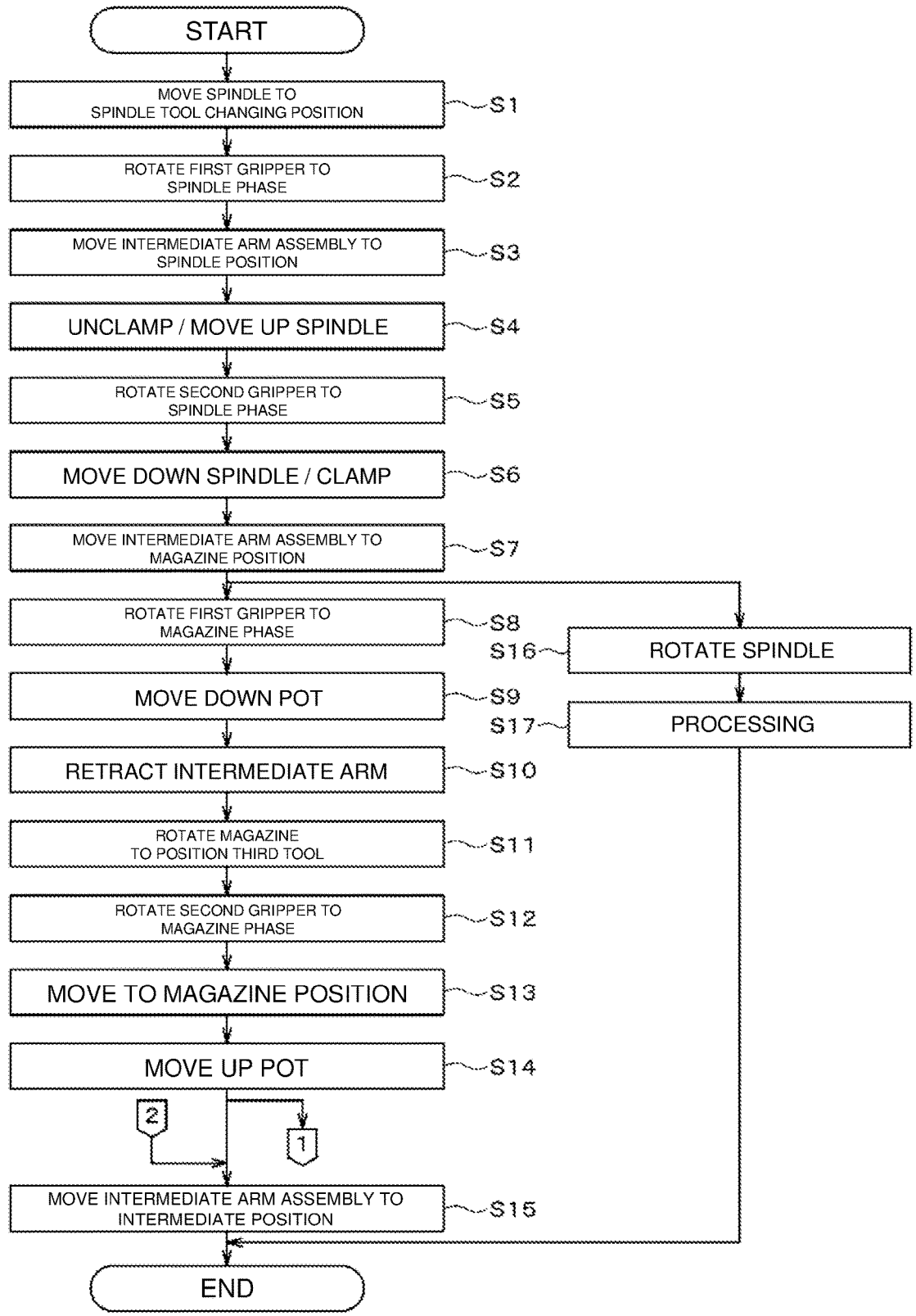
FIG. 5 is a flowchart showing a tool changing method.

As shown in FIG. 4, the linear motion guide 60 includes a guide rail 60a, and a guide block 60b. The guide rail 60a, which extends in the Y-axis direction, is fixed to the frame 2.

As shown in FIG. 1, the intermediate arm assembly 50 is reciprocally installed to the linear motion guide 60 between the spindle 10 and the magazine disc 21.

As shown in FIG. 4, the intermediate arm assembly 50 includes a body 62, an arm 53, an arm rotation shaft 58, and an arm rotation device 59. The body 62 is movably installed with respect to the guide block 60b. The body 62 reciprocates among a magazine position A for changing the tool, an intermediate position B, and a spindle position C.

The arm rotation shaft 58 is supported to the body 62 via a bearing 61. The arm rotation shaft 58 extends in the vertical direction.

The arm rotation device 59, which is disposed on the body 62, rotatably drives the arm rotation shaft 58. The arm rotation device 59 includes a servo motor 59a, a driving pulley 59b, a driven pulley 59c, and an endless toothed belt 59d. The driving pulley 59b is fastened to the output shaft of the servo motor 59a. The driven pulley 59c is fastened to the arm rotation shaft 58. The endless toothed belt 59d is laid across the driving pulley 59b and the driven pulley 59c.

The configuration of the present embodiment is not limited. A motor, a speed reducer, and an arm may be combined, or the motor may be directly connected to the arm.

Figure 3:
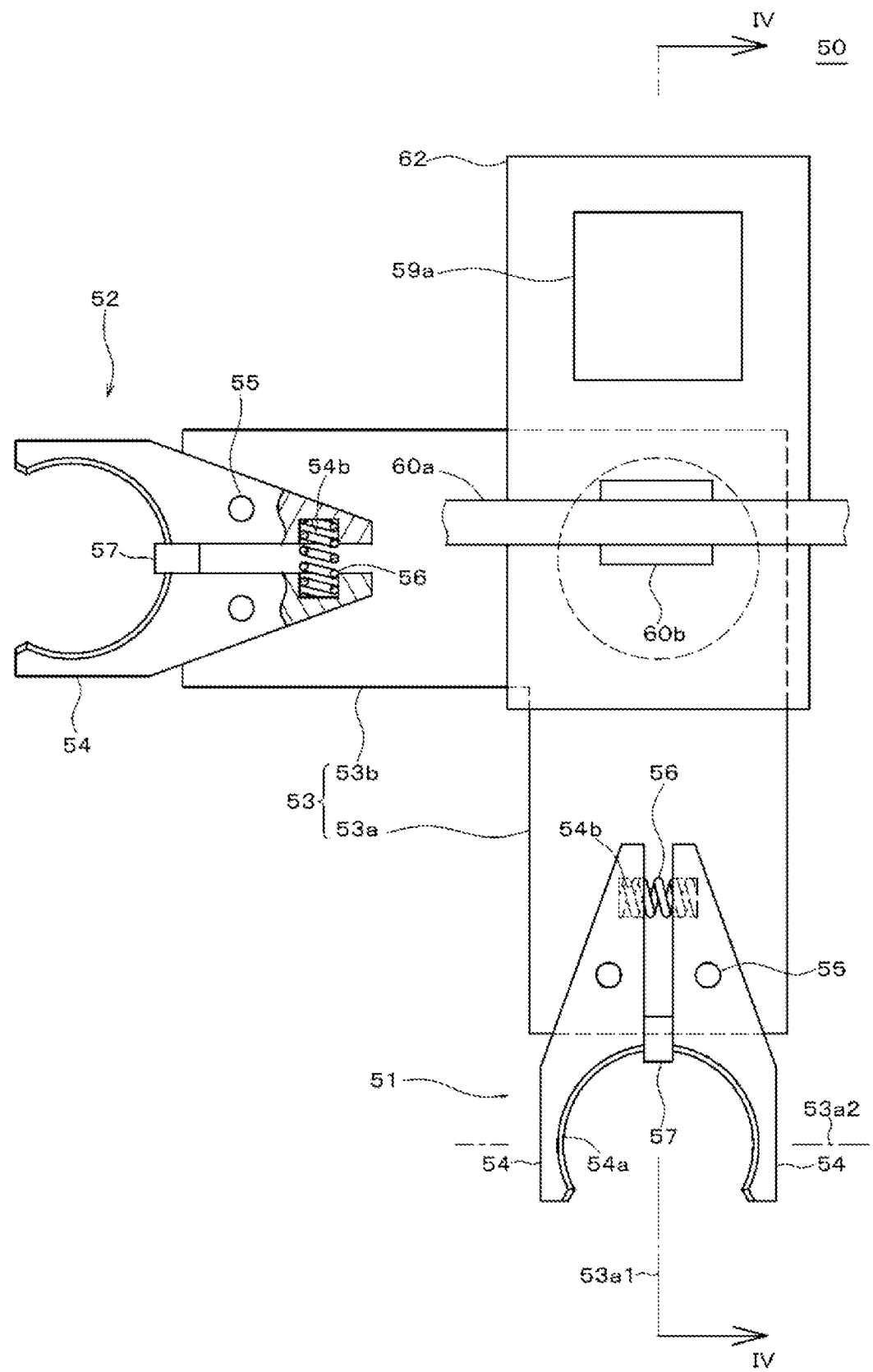
FIG. 3 is a plan view of an intermediate arm assembly of the first embodiment.

The arm 53 is fixed to the arm rotation shaft 58. As shown in FIG. 3, the arm 53 is, for example, a double arm. Two arms 53a, 53b extend from the arm rotation shaft 58. For example, the two arms 53a, 53b are arranged at an angle of 90 degrees to form an L-shape. The arm 53 rotates integrally with the arm rotation shaft 58.

The first gripper 51 and the second gripper 52 are respectively disposed at the distal end of the arm 53. The first gripper 51 removes the tool 12 mounted on the spindle 10 and returns it to the magazine 20. The second gripper 52 removes the tool 12 from the magazine 20 and mounts it on the spindle 10.

The first gripper 51 includes a pair of gripping claws 54, a support pin 55, an elastic member 56, and a key 57. The gripping claw 54 includes a claw portion 54a and a housing portion 54b.

The claw portion 54a is disposed on the distal end side of the support pin 55. The claw portion 54a abuts approximately half of the circumference of the flange 15 of the tool 12. The housing portion 54b is a bottomed cylindrical hole. The housing portion 54b is disposed inside the end portion on the proximal end side of the support pin 55. Here, a line connecting the center of the first gripper 51 from the center of the arm rotation shaft 58 is referred to as a center line 53a1. A line perpendicular to the center line 53a1 and the center axis 39 is referred to as a center line 53a2. The housing portion 54b extends perpendicular to the center line 53a1, and extends parallel to the center line 53a2.

The support pin 55 is fixed in parallel to the arm rotation shaft 58. Further, the support pins 55 are arranged symmetrically to the center line 53a1 of the arm 53a at the distal end of the arm 53a. The pair of gripping claws 54 are disposed symmetrically with respect to the center line 53a1. Each gripping claw 54 is rotatably supported at its center by the support pin 55. The housing portions 54b are disposed facing each other.

The elastic member 56 is, for example, a compression coil spring. The elastic member 56 is disposed inside the pair of housing portions 54b. The elastic member 56 urges the gripping claw 54 in a closing direction.

The key 57 is disposed at the distal end of the arm 53a in an intermediate portion between the pair of gripping claws 54. The key 57 serves as a detent for the gripping claw 54 and the tool 12. The key 57 is a mechanical stopper in the closing direction of the gripping claw 54. Further, when the first gripper 51 grips the tool 12, the key 57 fits into the key groove 13 of the tool 12.

The second gripper 52 has the same structure as the first gripper 51.

The intermediate arm feeder 70 is fixed to the frame 2. The intermediate arm feeder 70 is, for example, a servo motor ball screw mechanism, or a rack and pinion mechanism cylinder. The intermediate arm feeder 70 reciprocates the intermediate arm assembly 50.

Referring to FIGS. 1 and 5 to 8, the tool changing method in a memory random type of the present embodiment will be described.

The spindle 10 rotates to the origin, and the spindle 10 moves to a spindle tool changing position D (see FIG. 6) in step S1.

The arm rotation device 59 rotates the first gripper 51 to a spindle phase E (see FIG. 6) in step S2.

Figure 6:
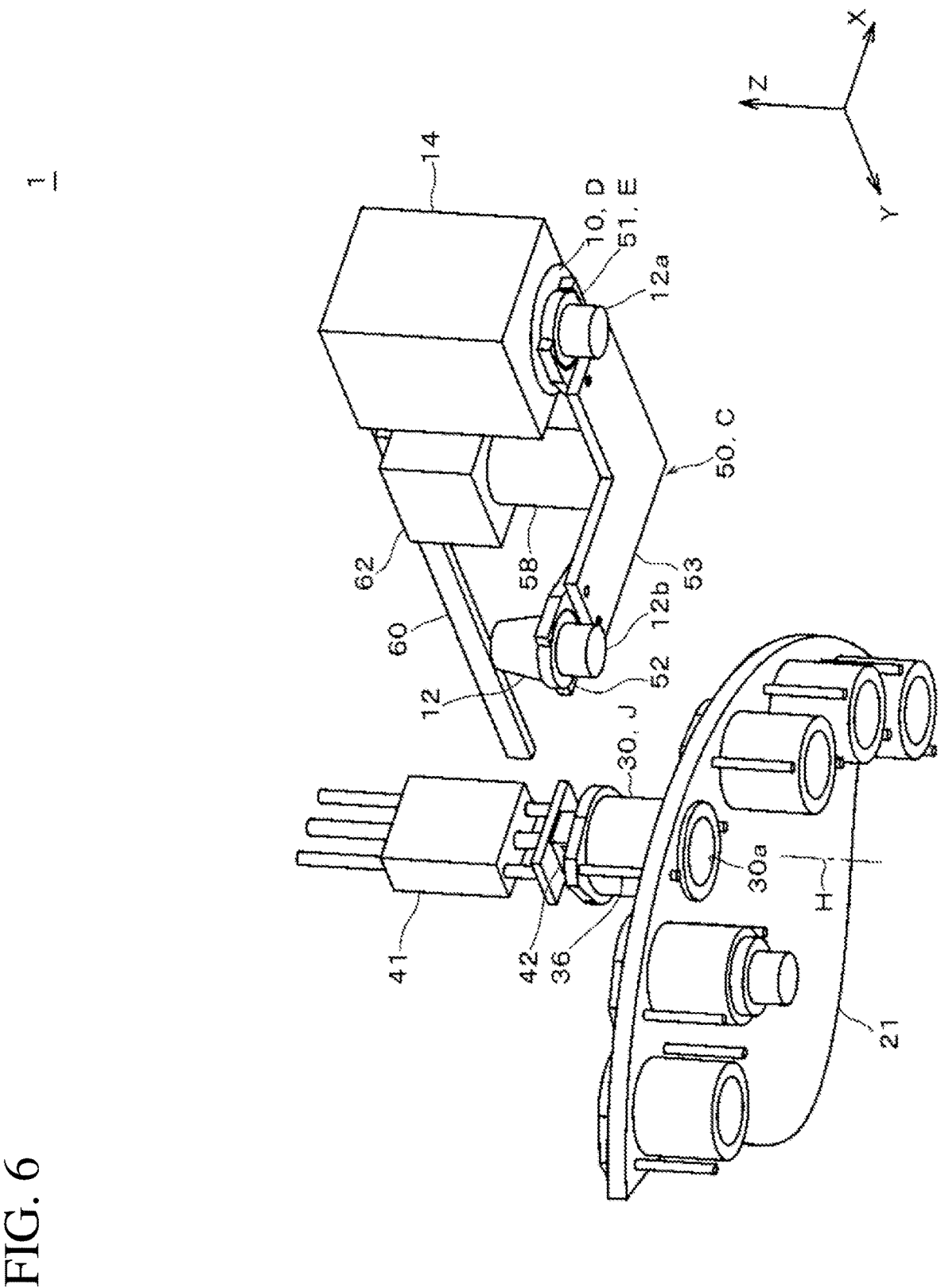
FIG. 6 is a perspective view showing the tool changing status.

As shown in FIG. 6, the intermediate arm assembly 50 moves from an intermediate position B (see FIG. 1) between the magazine disc 21 and the spindle 10 to a spindle position C in step S3. Then, the first gripper 51 grips the first tool 12a mounted on the spindle 10. At this time, the key 57 provided in the first gripper 51 is inserted into the key groove 13, and the gripping claw 54 grips the first tool 12a by the elastic force of the elastic member 56.

Here, the intermediate position B is a position where the intermediate arm assembly 50 stands by. For example, the intermediate position B is a position where the intermediate arm assembly 50 does not, inside a shutter (not shown), interfere with the shutter. The spindle position C is a position of the intermediate arm assembly 50 where the first gripper 51 or the second gripper 52 is capable of changing the tool 12 to the spindle 10 when the first gripper 51 or the second gripper 52 is at the spindle phase E. The position of the spindle 10 at this time is the spindle tool changing position D.

Steps S2 and S3 may be performed simultaneously.

Next, as shown in FIG. 7, the spindle 10 unclamps the first tool 12a. Then, the moving device 11 moves up the spindle 10 to a position where the first tool 12a is away from the spindle 10 in step S4. At this time, the first tool 12a is removed from the spindle 10 to be passed to the first gripper 51.

Subsequently, the arm rotation device 59 rotates the second gripper 52 gripping the second tool 12b to the spindle phase E in step S5. In FIG. 7, the second gripper 52 rotates 90 degrees counterclockwise as viewed from above. Then, the second tool 12b is positioned below on the axis of the spindle 10.

The moving device 11 moves down the spindle 10 to clamp the second tool 12b in step S6.

Next, the intermediate arm assembly 50 is moved to the magazine position A in step S7. When the intermediate arm assembly 50 begins to move, the gripping claws 54 are pushed open by the flange, and the second gripper 52 releases the second tool 12b. Then, the second gripper 52 grips nothing.

The spindle 10 rotates in step S16. The spindle 10 processes a workpiece in step S17.

Figure 8:
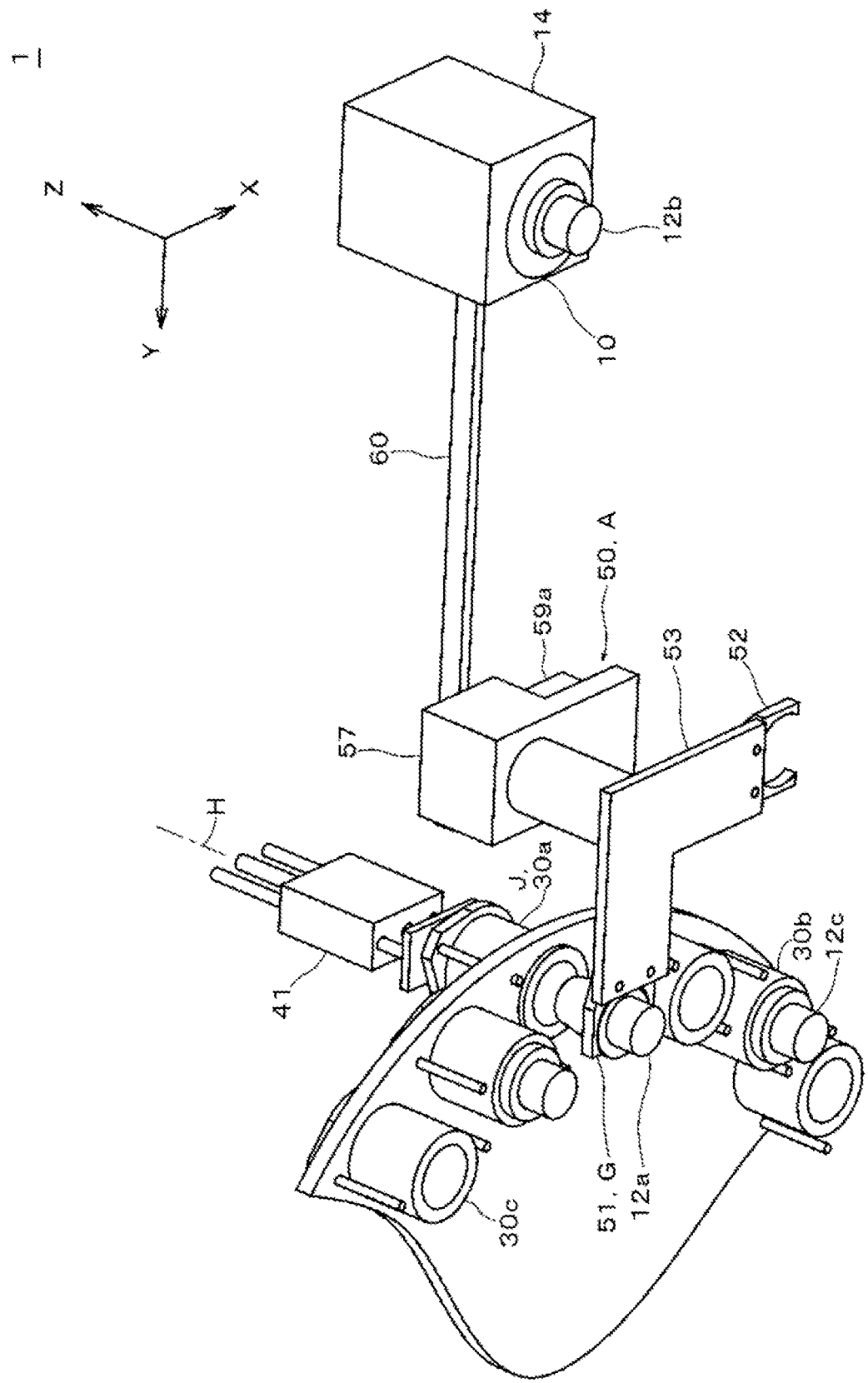
FIG. 8 is a perspective view showing the tool changing status.

Subsequently, as shown in FIG. 8, the arm rotation device 59 rotates the first gripper 51 to a magazine phase G in step S8. Then, the first tool 12a is located below the empty first pot 30a on the axis of the pot 30. That is, the magazine phase G is the phase of the arm 53 in which the tool 12 gripped by the first gripper 51 or the second gripper 52 is located on the center axis 39 of the pot 30 when the intermediate arm assembly 50 is at the magazine position A.

Steps S7 and S8 may be performed simultaneously. Preferably, step S7 ends after step S8 ends. That is, the intermediate arm assembly 50 preferably reaches the magazine position A after the first gripper 51 has been rotated to the magazine phase G.

Next, in step S9, the cylinder 41 extends so that the pot lifter 40 moves down the pot 30a. At this time, the hook member 42 is lowered for the catch claw 47 to push the knob 34, and the pot 30 moves down to the changing position K (see FIG. 1). Then, the first tool 12a is housed in the first pot 30a.

Figure 9:
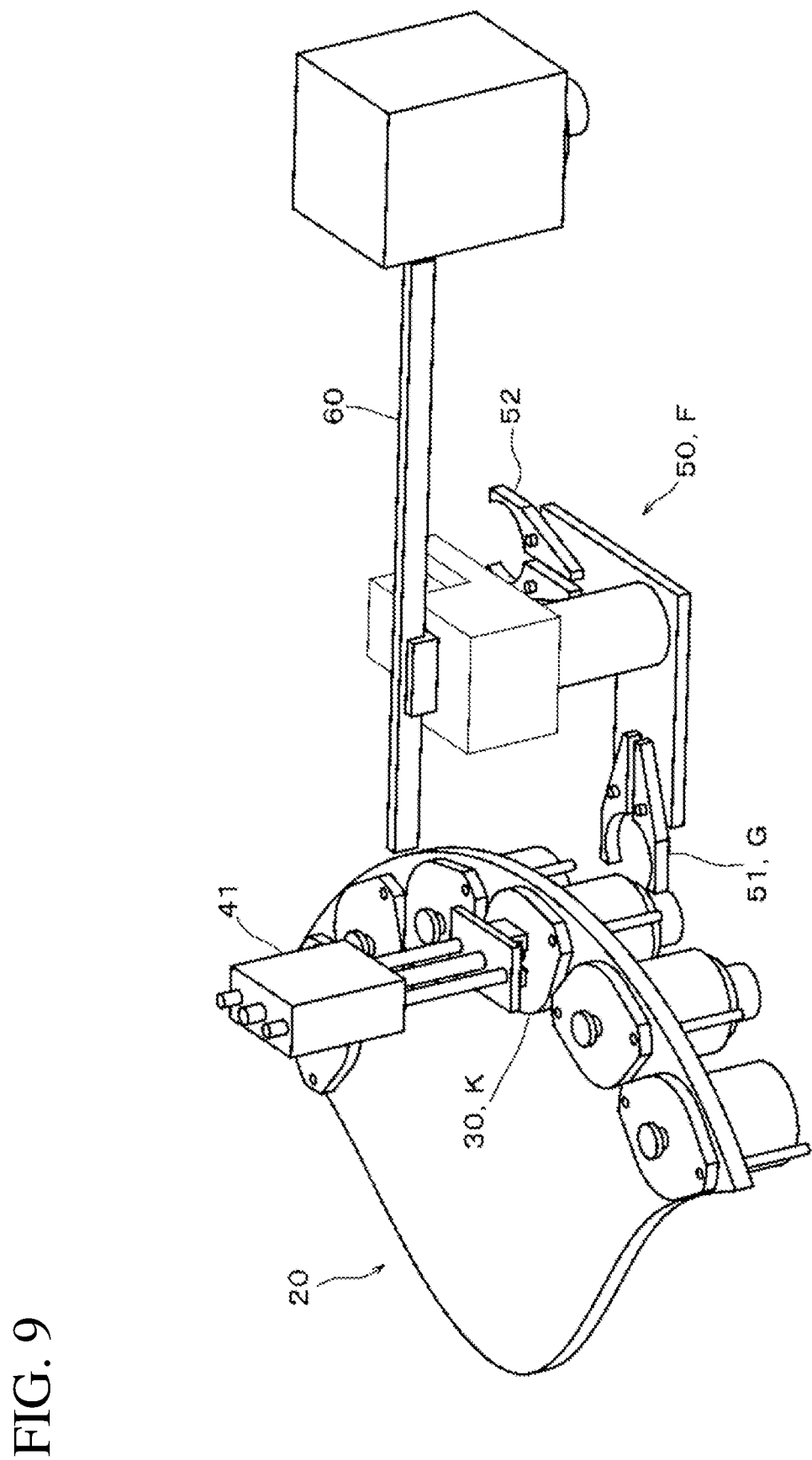
FIG. 9 is a perspective view showing the tool changing status.

Next, as shown in FIG. 9, the arm 53 retracts to a retracted position F in step S10. Then, the first gripper 51 releases the first tool 12a in step S10. Here, the retracted position F is the position of the intermediate arm assembly 50 away from the magazine 20 so that the first gripper 51 does not interfere with the pot 30 and the tool 12 housed in the pot 30 when the magazine 20 rotates. The retracted position F may be the same position as the intermediate position B.

The magazine 20 positions the second pot 30b to which the third tool 12c is mounted to the pot tool changing position H in step S11.

The arm rotation device 59 rotates the second gripper 52 to the magazine phase G in step S12. Steps S11 and S12 may be performed simultaneously.

Subsequently, the intermediate arm assembly 50 moves to the magazine position A in step S13. Then, the second gripper 52 grips the third tool 12c.

Subsequently, the cylinder 41 moves up the piston rod 43 in step S14. Then, the catch claw 47 catches the knob 34 to move up the second pot 30b. Then, the third tool 12c is detached from the second pot 30b, and the second pot 30b passes the third tool 12c to the second gripper 52.

Next, the intermediate arm assembly 50 moves to the intermediate position B in step S15. This completes the tool change. When the tool change is completed, the first gripper 51 grips nothing, and the second gripper 52 grips the third tool 12c to be changed next. Steps S8 to S15 are performed in parallel with steps S16 and S17. The intermediate arm assembly 50 stands by at the intermediate position B until a next tool change is made.

Figure 10:
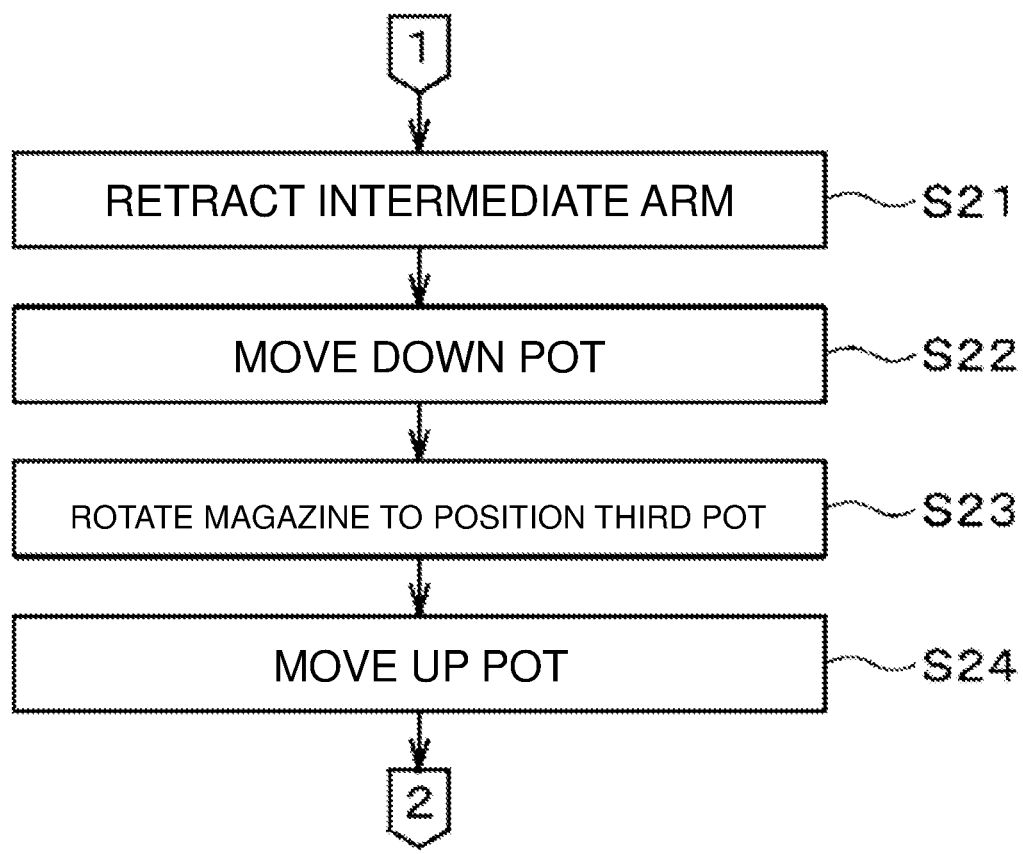
FIG. 10 is a flowchart showing an another embodiment of the tool changing method.

FIG. 10 is a flowchart of steps S21 to S24 in the fixed address system. Steps S21 to S24 are inserted between steps S14 and S15.

After performing step S14, the arm 53 retracts to the retracted position F in step S21. The pot lifter 40 moves down the pot 30 in step S22. The magazine 20 rotates to position the third pot 30c corresponding to the second tool 12b to the pot tool changing position H in step S23. The pot lifter 40 moves up the third pot 30c in step S24.

Second Embodiment

Figure 11:
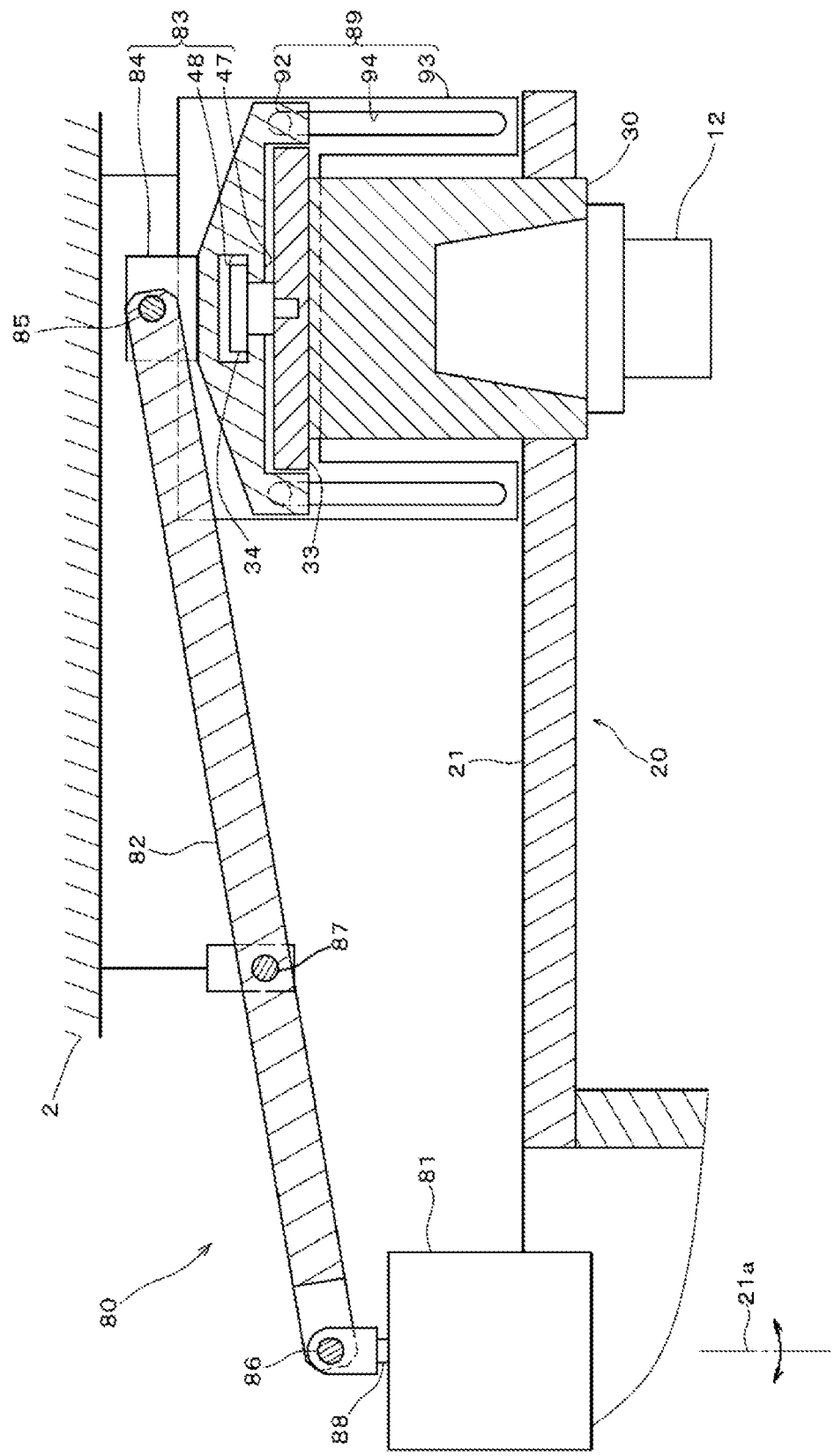
FIG. 11 is a cross-sectional view of a pot lifter of a second embodiment.

FIG. 11 is a cross-sectional view of the YZ axis plane of a pot lifter 80 according to a second embodiment. As shown in FIG. 11, the pot lifter 80 of the present embodiment includes a cylinder 81, a lever 82, a hook member 83, and a linear motion guide 89.

The hook member 83, which has a flat plate shape extending in the front-rear direction, includes a catch claw 47, a passage hole 48, a trunnion portion 84, and a guide pin 92. The catch claw 47 is disposed on the lower side of the center portion of the hook member 83. The guide pins 92 are installed at both ends of the hook member 83.

The cylinder 81 includes a rod 88. The cylinder 81 is disposed, for example, on the rotation axis of the magazine disc 21. The cylinder 81 moves up and down the rod 88 in the vertical direction.

The lever 82 includes a fulcrum 87, a working point 85, and a force point 86. The fulcrum 87 is located in the center portion of the lever 82. The working point 85 is located at a first end of the lever 82 on the side of the pot 30. The force point 86 is located at a second end of the lever on the side of the cylinder 81. The fulcrum 87 is fixed to the frame 2. The lever 82 is rotated about the fulcrum 87. The trunnion portion 84 is rotatably connected to the working point 85. The rod 88 is pivotally connected to the force point 86.

The linear motion guide 89 includes a guide plate 93, a guide groove 94, and a guide pin 92. The guide plate 93, which has an inverted U-shape, extends in the YZ direction. The guide plate 93 is fixed to the frame 2. The guide groove 94, which extends in the vertical direction, is disposed at both ends of the guide plate 93. The guide groove 94 may pass through the guide plate 93. The guide pin 92 provided on the hook member 83 slides with the guide groove 94. The linear motion guide 89 guides the hook member 83 to keep the posture of the hook member 83 horizontally when the hook member 83 moves up and down. The linear motion guide 89 may be, for example, a ball spline, linear guide, or a combination of a guide bush and the guide pin.

The pot lifter 80 moves up and down the rod 88 to move up and down the hook member 83 via the lever 82 using a principle of leverage. For example, when the rod 88 moves down, the force point 86 connected to the rod 88 also moves down, while the hook member 83 connected to the working point 85 moves up. On the contrary, when the rod 88 moves up, the hook member 83 moves down.

The present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

1 Machine tool (Vertical machine tool)
2 Frame
10 Spindle
11 Moving device
12, 12a, 12b, 12c Tool
20 Magazine
21 Magazine disc
22 Pot holding hole
30 Pot
40 Pot lifter
50 Intermediate arm assembly
51 First gripper
52 Second gripper
59 Arm rotation device
60 Linear motion guide

What is claimed is:

1. A vertical machine tool, comprising:
    a frame;
    a spindle having a spindle hole configured to mount a tool;
    a spindle mover installed on the frame, the spindle mover configured to move the spindle with respect to the frame;
    a magazine including:
        a rotatable magazine disc having a plurality of pot holding holes, and
        a plurality of pots, each of the plurality of pots being configured to house a respective tool therein and each of the plurality of pots being received within a respective one of the plurality of pot holding holes, wherein each of the plurality of pots is configured to be moved up and down between an elevated position and a changing position;
    a pot lifter installed on the frame, the pot lifter configured to move up and down from the changing position to the elevated position a given pot of the plurality of pots that is located at a pot tool changing position;
    a linear motion guide installed on the frame;
    an intermediate arm assembly installed on the linear motion guide, the intermediate arm assembly including:
        an arm including a first gripper and a second gripper, and
        an arm rotation device configured to position the first gripper or the second gripper to either a magazine phase position or a spindle phase position; and
    an intermediate arm feeder configured to move the intermediate arm assembly among a magazine position, a spindle position, and an intermediate position located between the magazine position and the spindle position, wherein
    the pot lifter has a hook member, and each of the plurality of pots has a respective top plate to which an associated knob is attached, and
    when the magazine disc is rotated about the axis of rotation so as to bring the given pot of the plurality of pots into the pot tool changing position, the knob of the given pot is received within the hook member such that the pot lifter catches the given pot, and
    when the pot lifter catches the given pot, the pot lifter is able to lift the given pot up into the elevated position such that the first gripper or the second gripper can move the tool associated with the given pot back and forth below the given pot without the first gripper or the second gripper causing the given pot to interfere with the associated tool.

2. The vertical machine tool according to claim 1, wherein
    when the intermediate arm assembly is located at the magazine position, the intermediate arm assembly passes the associated tool between the first gripper or the second gripper and the given pot located at the changing position, and
    when the intermediate arm assembly is located at the spindle position, the intermediate arm passes the associated tool between the first gripper or the second gripper and the spindle located at a spindle tool changing position.

3. The vertical machine tool according to claim 2, wherein
    in the magazine, each of the plurality of pot holding holes has a guide bush corresponding thereto, and
    each of the plurality of pots has a respective guide connected thereto, and each guide slides inside one of the respective guide bushes.

4. The vertical machine tool according to claim 2, wherein
    the pot lifter includes a cylinder fixed to the frame, and the cylinder is configured to individually move each of the plurality of pots up and down.

5. The vertical machine tool according to claim 2, wherein
    the hook member is connected to a cylinder of the pot lifter, the hook member including:
        a passage hole through which each knob is able to pass when the magazine disc rotates, and
        a catch claw configured to catch a given knob when the magazine disc rotates the one of the plurality of pots to which the given knob is attached to the pot tool changing position.

6. The vertical machine tool according to claim 1, wherein
    in the magazine, each of the plurality of pot holding holes has a guide bush corresponding thereto, and
    each of the plurality of pots has a respective guide connected thereto, and each guide slides inside one of the respective guide bushes.

7. The vertical machine tool according to claim 6, wherein
    each top plate is disposed above the magazine disc and each is connected to the corresponding pot and the guide connected thereto, and
    each top plate is configured to move up and down integrally with the corresponding pot and the guide connected thereto.

8. The vertical machine tool according to claim 7, wherein
    the pot lifter includes a cylinder fixed to the frame, and the cylinder is configured to individually move each of the plurality of pots up and down.

9. The vertical machine tool according to claim 7, wherein
    the hook member is connected to a cylinder of the pot lifter, the hook member including:
        a passage hole through which each knob is able to pass when the magazine disc rotates, and
        a catch claw configured to catch a given knob when the magazine disc rotates the one of the plurality of pots to which the given knob is attached to the pot tool changing position.

10. The vertical machine tool according to claim 6, wherein
    the pot lifter includes a cylinder fixed to the frame, and the cylinder is configured to individually move each of the plurality of pots up and down.

11. The vertical machine tool according to claim 6, wherein
    the hook member is connected to a cylinder of the pot lifter, the hook member including:
        a passage hole through which each knob is able to pass when the magazine disc rotates, and
        a catch claw configured to catch a given knob when the magazine disc rotates the one of the plurality of pots to which the given knob is attached to the pot tool changing position.

12. The vertical machine tool according to claim 1, wherein
    the pot lifter includes a cylinder fixed to the frame, and the cylinder is configured to individually move each of the plurality of pots up and down.

13. The vertical machine tool according to claim 12, wherein the cylinder is a guided cylinder.

14. The vertical machine tool according to claim 12, wherein the pot lifter includes:
a lever, the lever including:
a working point located at a first end and pivotally connected to the given pot of the plurality of pots,
a force point located at a second end that is opposite from the first end, the force point pivotally connected to the cylinder, and
a fulcrum located at a center portion and fixed to the frame,
the lever pivotable about the fulcrum, and
a linear motion guide configured to guide the given pot in a vertical direction.

15. The vertical machine tool according to claim 12, wherein
the hook member is connected to the cylinder, the hook member including:
a passage hole through which each knob is able to pass when the magazine disc rotates, and
a catch claw configured to catch a given knob when the magazine disc rotates the one of the plurality of pots to which the given knob is attached to the pot tool changing position.

16. The vertical machine tool according to claim 1, wherein
the hook member is connected to a cylinder of the pot lifter, the hook member including:
a passage hole through which each knob is able to pass when the magazine disc rotates, and
a catch claw configured to catch a given knob when the magazine disc rotates the one of the plurality of pots to which the given knob is attached to the pot tool changing position.

17. The vertical machine tool according to claim 1, wherein
each tool includes a respective key groove, and
the first gripper and the second gripper each includes:
a respective pair of gripping claws rotatably supported by the arm,
a respective key disposed on the arm to be sandwiched by the corresponding pair of gripping claws, the key configured to be inserted into a given key groove, and
an elastic member disposed in the corresponding pair of gripping claws, wherein the elastic member urges the pair of gripping claws in a direction to close.

18. The vertical machine tool according to claim 1, wherein the arm has an L-shape.

19. A tool changing method, comprising:
providing the vertical machine tool according to claim 1;
stopping rotation of the spindle of the vertical machine tool;
moving the spindle to a spindle tool change position;
rotating the first gripper to the spindle phase position by the arm of the intermediate arm assembly of the vertical machine tool;
moving the arm from the intermediate position between the magazine and the spindle to the spindle tool change position for the first gripper to grip a first tool that is mounted on the spindle;
unclamping the first tool by moving the spindle up with the spindle mover while the first gripper is gripping the first tool;
rotating the arm so as to place the second gripper, which is gripping a second tool, into the spindle phase position;
moving the spindle down with the spindle mover to clamp the second tool;
moving the arm to the magazine position in order for the second gripper to release the second tool which is clamped by the spindle;
rotating the first gripper to the magazine phase position;
moving the arm to the magazine position for the first tool to be located under an empty first pot of the plurality of pots;
moving down the pot lifter of the vertical machine tool so as to house the first tool within the first pot;
retracting the arm to a retracted position such that the first gripper releases the first tool;
rotating the magazine disc so as to place a second pot of the plurality of pots, which houses a third tool, into the pot tool changing position;
rotating the arm so as to place the second gripper into the magazine phase position;
moving the arm to the magazine position in order for the second gripper to grip the third tool;
moving the second pot up with the pot lifter so as to pass the third tool to the second gripper; and
moving the arm to the intermediate position.

20. The tool change method according to claim 19, further comprising:
retracting the arm to the retracted position;
moving down the pot lifter;
rotating the magazine disc so as to place a third pot of the plurality of pots, the third pot corresponding to the second tool, into the pot tool changing position; and
moving the third pot up with the pot lifter.

* * * * *